(12) United States Patent
Swift

(10) Patent No.: US 7,314,549 B2
(45) Date of Patent: Jan. 1, 2008

(54) STORM WATER INTERCEPTOR

(75) Inventor: Gavin Swift, Thunder Bay (CA)

(73) Assignee: Storm Pal Inc., Ontario (CA)

( * ) Notice: Subject to any disclaimer, the term of this patent is extended or adjusted under 35 U.S.C. 154(b) by 77 days.

(21) Appl. No.: 11/404,183

(22) Filed: Apr. 14, 2006

(65) Prior Publication Data
US 2007/0241052 A1  Oct. 18, 2007

(51) Int. Cl.
*E03F 5/16* (2006.01)

(52) U.S. Cl. .............. 210/170.03; 210/521; 210/532.1; 210/538

(58) Field of Classification Search ................ 210/163, 210/164, 170.03, 532.1, 538, 521
See application file for complete search history.

(56) References Cited

U.S. PATENT DOCUMENTS

| | | | |
|---|---|---|---|
| 1,407,389 A * | 2/1922 | Egan ........................ | 210/538 |
| 1,793,599 A * | 2/1931 | Egan ...................... | 210/170.03 |
| 4,136,010 A | 1/1979 | Pilié et al. | |
| 4,261,823 A * | 4/1981 | Gallagher et al. .......... | 210/164 |
| 5,433,845 A * | 7/1995 | Greene et al. ......... | 210/170.03 |
| 5,725,760 A | 3/1998 | Monteith | |
| 5,746,911 A * | 5/1998 | Pank ...................... | 210/170.03 |
| 5,746,912 A * | 5/1998 | Monteith ................. | 210/532.1 |
| 5,753,115 A | 5/1998 | Monteith | |
| 5,849,181 A | 12/1998 | Monteith | |
| 6,062,767 A | 5/2000 | Kizhnerman et al. | |
| 6,077,448 A | 6/2000 | Tran-Quoc-Nam et al. | |
| 6,371,690 B1 | 4/2002 | Monteith | |
| 6,547,962 B2 | 4/2003 | Kistner et al. | |
| 6,797,161 B2 | 9/2004 | Use et al. | |
| 2005/0103698 A1 * | 5/2005 | Eberly ..................... | 210/532.1 |

FOREIGN PATENT DOCUMENTS

| | | | |
|---|---|---|---|
| DE | 4110091 | * | 11/1991 |
| DE | 4321075 | * | 5/1994 |

* cited by examiner

*Primary Examiner*—Christopher Upton
(74) *Attorney, Agent, or Firm*—Pearne & Gordon LLP

(57) ABSTRACT

A storm water interceptor comprises an input conduit connected to a first treatment tank for delivering storm water to the first treatment tank and having an obvert elevation. Also, the interceptor comprises a lower conduit having an invert elevation, a substantially horizontal orifice at a first end connected to the first treatment tank and an exit orifice at an opposite end connected to a second treatment tank, whereby the substantially horizontal orifice at the first end of the lower conduit is below the invert elevation of the lower conduit. The interceptor further comprises an overflow conduit connecting the first treatment tank to the second treatment tank, whereby the overflow conduit is connected to the first treatment tank at a location above the obvert elevation of the input conduit. As well, there is an output conduit having a substantially horizontal orifice at a first end connected to the second treatment tank and an exit portion extending away from the second treatment tank, whereby an invert elevation of the output conduit is above an obvert elevation of the lower conduit, and whereby the substantially horizontal orifice at the first end of the output conduit is below the invert elevation of the output conduit. More than two treatment tanks may be connected in a cascading manner using the same general components and principles as an interceptor having two treatment tanks.

20 Claims, 3 Drawing Sheets

STORM WATER INTERCEPTOR

FIELD OF INVENTION

The present invention relates to an interceptor for removing sediment, screening debris and separating oil from storm water runoff.

BACKGROUND OF THE INVENTION

Rain water and other runoff are typically absorbed into the ground. However, in cases where absorption is not possible, such as in locations where there are asphalt, concrete or other highly impervious surfaces, such runoff often enters sewer systems, where it is eventually drained into a body of water such as a lake or river. Examples of highly impervious areas include parking lots, large boulevards, gas stations, loading docks and roadside rest areas. During severe rainfalls, storm water runoff levels can rise dramatically in areas where the water cannot directly be absorbed into the ground. Accordingly, there is a need for storm water sewer systems to be able to handle high volumes of water on such occasions.

Storm water sewer systems must also be able to intercept undesirables, such as oil based products, grit, sediment, debris and other waste, that mix in with the storm water, from entering into any lakes or rivers. Regulations concerning efficiency standards for the separation of such undesirables are set by various government agencies, such as a provincial Ministry of the Environment in Canada or local by-law regulators. Accordingly, there is a need for storm water sewer systems to be able to efficiently separate oil, grit and other debris from the storm water itself.

Oil/grit separators have been around for many years. Through the use of one or more chambers, they are designed to remove sediment, screen debris and separate oil from storm water before the water is deposited in a lake or river. A typical oil/grit separator unit operates by settling sediment and particulate matter, screening debris, and separating free surface oils from storm water runoff. However, many of these oil/grit separators do not accommodate high volumes of storm water very well, as they are either not large enough in size or not configured efficiently. During high runoff volumes, many of these separators allow for storm water to "bypass" the normal oil/grit separation and be directly deposited into a body of water, thus elevating pollution levels in many cases.

Typical oil/grit separators are installed beneath the surface of an impervious area, which is the most suitable location for space conservation in ultra-urban environments. In addition to not being able to efficiently separate oil and grit during high flow volumes, some oil/grit separators are difficult and expensive to install in these sub-surface locations. For example, U.S. Pat. No. 6,077,448 discloses a robust multi-chambered oil/grit interceptor that is very large. While there is more than one chamber within the interceptor, the interceptor itself only has one very large tank, which would be cumbersome to install. Indeed, it is likely that a crane with a long boom would be required to lift and install this, and many other similar, oil/grit separators. Other oil/grit separators and similar storm water filtration systems, such as those disclosed in U.S. Pat. Nos. 6,797,161, 6,062,767, 5,849,181 and 5,725,760, teach multi-module, single-tank configurations, and not multi-tank configurations.

Some oil/grit separators and storm water treatment systems known to persons skilled in the art have modules that are separate and do not form a single tank. (For example, see U.S. Pat. Nos. 6,546,962, 6,371,690 and 5,746,911.) However, these separators and systems have complex interconnections and other barriers that make them difficult to install. As well, their configurations make them less than optimal in terms of efficiently separating oils and grits from storm water, and cause them to perform poorly during times of high water volumes. Poor performance during high storm water volumes is a common occurrence in prior art configurations that employ weirs. (Weirs are less desirable, as they permit storm water to flow untreated directly through a storm water treatment system in times of high water volumes.)

A further problem faced by many prior art oil/grit separators is the issue of pipe clogging. Where large debris, such as sticks or plastic bags, enters the storm water treatment system, inlet orifices and other conduits that have not had the benefit of earlier filtering and/or that are too small in size may become plugged, thus causing a back up of storm water. Prior art oil/grit separators having screens or other moving parts that can easily become plugged, or even broken, require more frequent maintenance as a result.

Accordingly, there is a need for a storm water interceptor that is able to accommodate high volumes of water while at the same time efficiently separating out oils and grits, and ensuring a minimal amount of storm water bypasses the treatment stage.

BRIEF SUMMARY OF THE INVENTION

Some of the advantages realized in some but not necessarily all embodiments include: improved quality of storm water treatment; less expensive construction and installation costs; decreased storm water temperature; and, increased versatility and adaptability for various site conditions and geographic locations.

According to a first aspect of the present invention there is provided a storm water interceptor comprising: an input conduit connected to a first treatment tank for delivering storm water to the first treatment tank and having an obvert elevation; a lower conduit having an invert elevation, a substantially horizontal orifice at a first end connected to the first treatment tank and an exit orifice at an opposite end connected to a second treatment tank, whereby the substantially horizontal orifice at the first end of the lower conduit is below the invert elevation of the lower conduit; an overflow conduit connecting the first treatment tank to the second treatment tank, whereby the overflow conduit is connected to the first treatment tank at a location above the obvert elevation of the input conduit; and, an output conduit having a substantially horizontal orifice at a first end connected to the second treatment tank and an exit portion extending away from the second treatment tank, whereby an invert elevation of the output conduit is above an obvert elevation of the lower conduit, and whereby the substantially horizontal orifice at the first end of the output conduit is below the invert elevation of the output conduit.

According to a second aspect of the present invention there is provided a storm water interceptor comprising: a plurality of treatment tanks, wherein the plurality comprises at least primary, secondary and tertiary treatment tanks; an input conduit connected to the primary treatment tank for delivering storm water to the primary treatment tank and having an obvert elevation; a plurality of lower conduits each having a substantially horizontal orifice at a first end and each connected to one of the plurality of treatment tanks, and each having an exit orifice at an opposite end each connected to an adjacent one of the plurality of treatment tanks, whereby each of the substantially horizontal orifices at the first ends of the respective lower conduits are below invert elevations of the respective lower conduits; a plurality of overflow conduits each connecting one of the plurality of treatment tanks to an adjacent one of the plurality of treatment tanks, whereby the overflow conduit connected to the primary treatment tank is located above the obvert elevation of the input conduit; and, an output conduit having an invert elevation, a substantially horizontal orifice at a first end connected to a last treatment tank and an exit portion extending away from the last treatment tank, whereby the invert elevation of the output conduit is above an obvert elevation of an adjacent lower conduit, and whereby the substantially horizontal orifice at the first end of the output conduit is below the invert elevation of the output conduit.

DETAILED DESCRIPTION OF THE INVENTION

Figure 1:
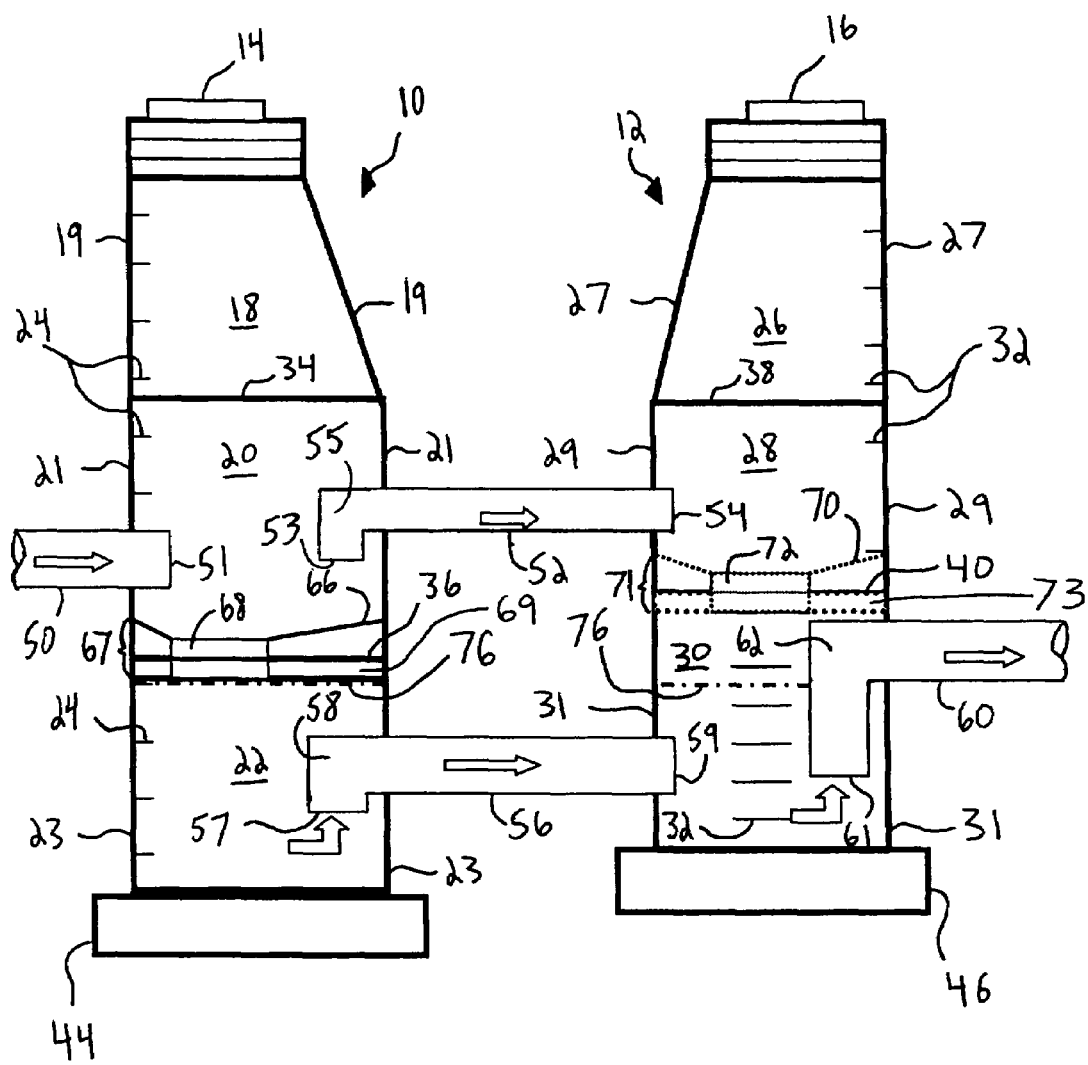
FIG. 1 is a cross-sectional view of a first exemplary embodiment of the present invention, showing primary and secondary treatment tanks, wherein the large arrows indicate the general flow direction of storm water.
Figure 2:
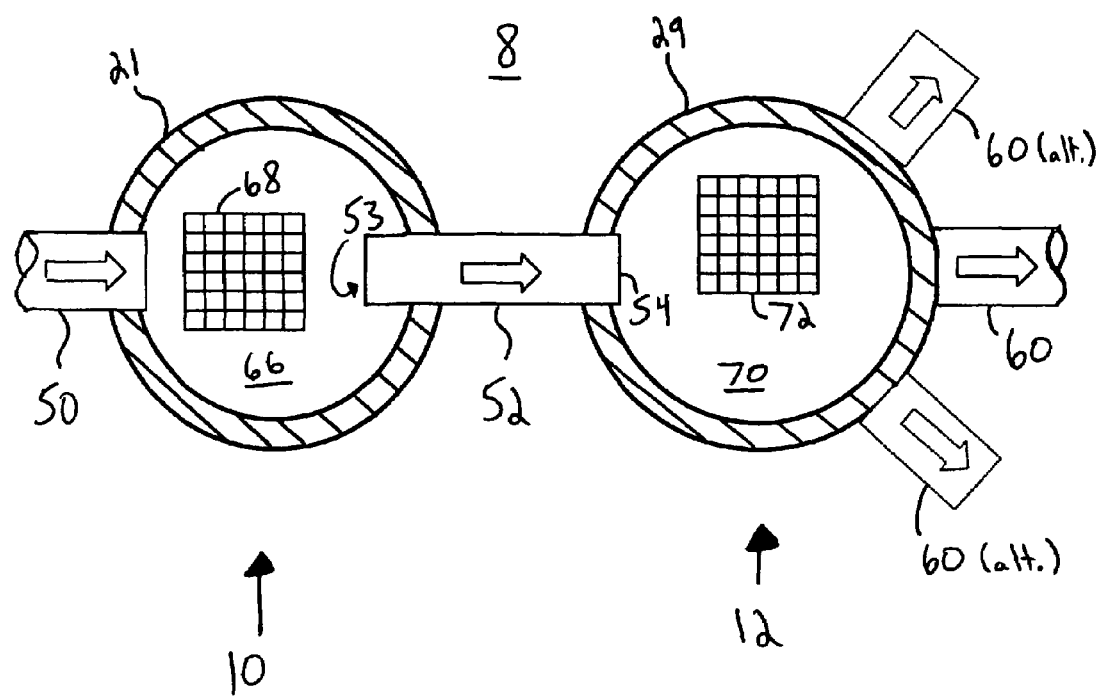
FIG. 2 is a plan view section of the embodiment shown in FIG. 1, wherein the large arrows indicate the general flow direction of storm water.
Figure 3:
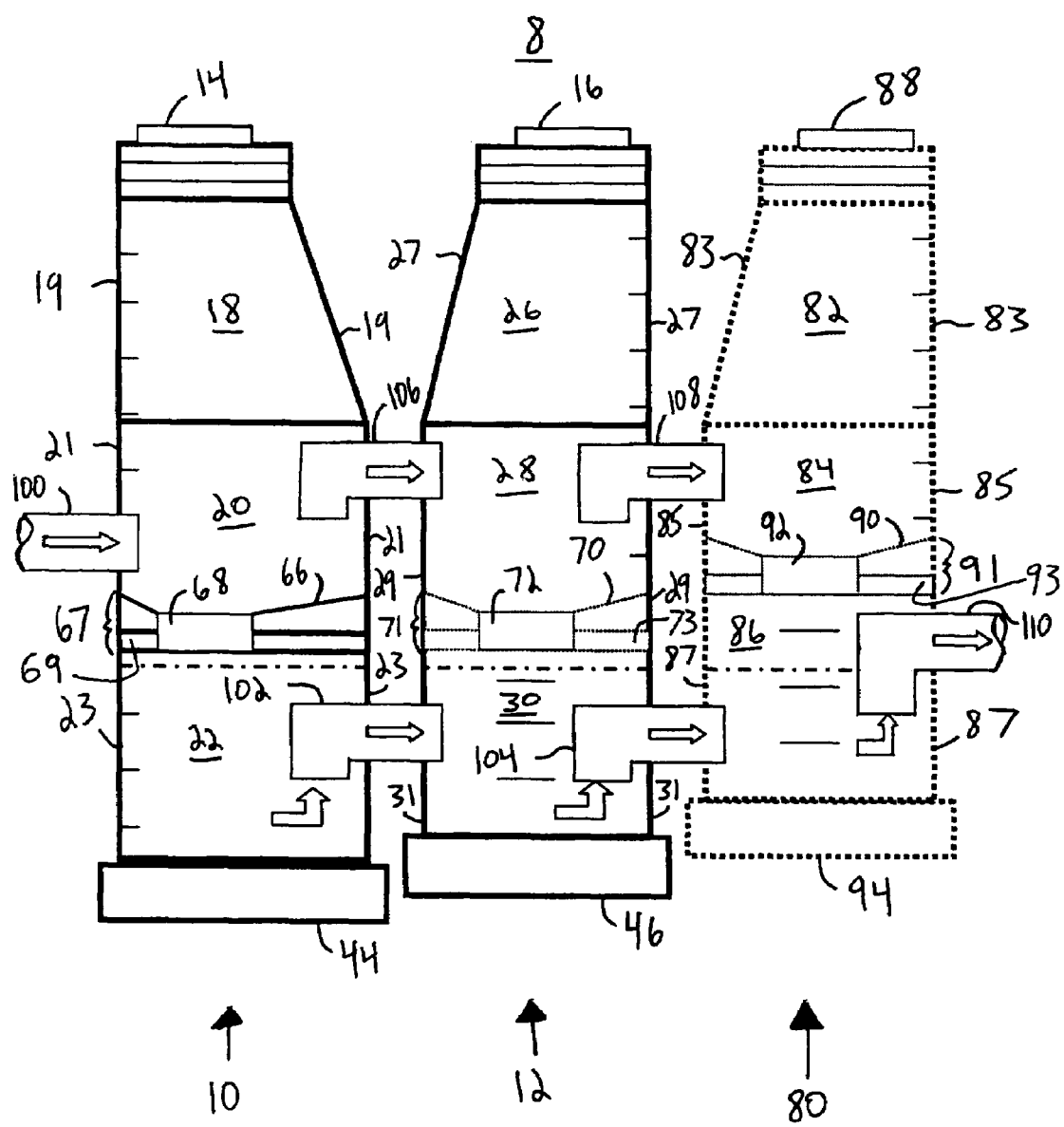
FIG. 3 is a cross-sectional view of another exemplary embodiment of the present invention, showing primary, secondary and tertiary (dotted lines) treatment tanks, wherein the large arrows indicate the general flow direction of storm water.

With reference to FIGS. 1-3, a storm water interceptor 8 provides for the separation of trash, grit, oil, sediments and other debris from storm water. The storm water interceptor 8 is designed to perform such separation efficiently, even in periods of high water volumes.

FIG. 1 is a cross-sectional view of a first exemplary embodiment of the storm water interceptor 8, which has a primary treatment tank 10 and a secondary treatment tank 12. The treatment tanks 10, 12 are preferably cylindrical or substantially cylindrical in shape. Each treatment tank 10, 12 has a cover 14, 16, respectively. Depending on the particular site installation requirements that are imposed on the storm water interceptor 8, the cover 14 for the primary treatment tank 10 is preferably either a solid manhole lid (not shown) or a catch basin grate (not shown). The cover 16 for the secondary treatment tank 12 is preferably a solid manhole lid to keep large debris from entering the secondary treatment tank. A finish grade for the covers 14, 16 is set using pre-cast moduloc rings varying in thickness from 50 mm to 100 mm.

Inside the primary treatment tank 10 are preferably three sections, namely, a first transition section 18, a first upper barrel section 20 and a first lower barrel section 22; however, alternative embodiments may have a greater or fewer number of sections within a tank. Being part of the primary treatment tank 10, these modular sections 18, 20, 22 are at least substantially cylindrical and have respective first transition section wall 19, first upper barrel section wall 21 and first lower barrel section wall 23 that are each made from reinforced pre-cast concrete. Inside the primary treatment tank 10 and its sections 18, 20, 22 is a ladder 24 for access by maintenance personnel. The ladder 24 is securely affixed to the insides of the walls 19, 21, 23 in the sections 18, 20, 22, respectively. Similarly, inside the secondary treatment tank 12 are second transition section 26 having second transition section wall 27, second upper barrel section 28 having second upper barrel section wall 29, and second lower barrel section 30 having second lower barrel section wall 31, as well as a ladder 32, which is securely affixed to the insides of the walls 27, 29, 31 in the sections 26, 28, 30, respectively.

When installing the various sections 18, 20, 22 together to form the primary treatment tank 10, as well as when installing the various sections 26, 28, 30 together to form the secondary treatment tank 12, one would preferably place rubber mastic (not shown) at the joint 34 between the first transition section wall 19 and the first upper barrel section wall 21, the joint 36 between the first upper barrel section wall 21 and the first lower barrel section wall 23, the joint 38 between the second transition section wall 27 and the second upper barrel section wall 29, and the joint 40 between the second upper barrel section wall 29 and the second lower barrel section wall 31. The rubber mastic should be heated until it is pliable before joining together any of the various section walls 19, 21, 23 of the primary treatment tank 10, and section walls 27, 29, 31 of the secondary treatment tank 12. Following such joining, each of the joints 34, 36, 38, 40 are preferably mortared both inside and outside the respective section walls 19, 21, 23 in the primary treatment tank 10, and section walls 27, 29, 31 in the secondary treatment tank 12. Such mortaring preferably utilizes sand and portland cement with an acrylic and polymer admixture to ensure proper bonding (not shown). Where possible and available, a flexible waterproof caulking could be used instead of mortar. Further securing of the various sections 18, 20, 22 in the primary treatment tank 10, and sections 26, 28, 30 in the secondary treatment tank 12, is accomplished by anchoring three frost straps (not shown) vertically to the outside of the treatment tanks 10, 12. Preferably, such frost straps would be in the form of a 600-1200 mm×75 mm×6 mm galvanized plate and would be connected by a ¾ inch stainless steel nut and bolt combination that is anchored to some or all of the treatment tank walls 19, 21, 23 of the primary treatment tank 10.

Both the primary and secondary treatment tanks 10, 12 have rectangular base sections 44, 46, respectively. These base sections 44, 46 are preferably made from 300 mm-thick reinforced pre-cast concrete. Much like the other modular components of the present invention, such base sections 44, 46 can be easily lifted and set into place by a 225 CAT backhoe excavator or an equivalent thereof (not shown). Furthermore, raising or lowering the elevation of the base sections 44, 46 dictates the sump capacity of the primary and secondary treatment tanks 10, 12, respectively.

Connected to the primary treatment tank 10 is an input conduit 50, which permits storm water to enter the storm water interceptor 8. The input conduit 50 is made of either well-known PVC or HDPE piping. From an input orifice 51 of the input conduit 50 storm water is deposited into the first upper barrel section 20 of the primary treatment tank 10. During installation, the input conduit 50 is pushed into a water tight gasket (not shown) that is securely fitted to the first upper barrel section wall 21. Such a connection is ensured by having the first upper barrel section wall 21 core drilled to the appropriate diameter to insert a water-tight gasket that fits the outside diameter of the input conduit 50.

The primary treatment tank 10 preferably has a primary treatment tank maintenance platform 67. The primary treatment tank maintenance platform 67 comprises a first benched section 66, which is made of concrete poured in place during installation and is preferably sloped slightly, and a removable grate 68, which is held in place by the first benched section 66. Such a maintenance platform 67 is especially recommended when the cover 14 is a catch basin grate. The first benched section 66 is supported by a reinforced pre-cast concrete first flat cap section 69. The grate 68 allows storm water to flow from the first upper barrel section 20 to the first lower barrel section 22; however, the grate 68 substantially prevents large objects, such as sticks, rocks, plastic, tin cans and other large debris, from entering the first lower barrel section 22. Having such a grate 68 in the primary treatment tank 10, which acts to separate large debris, substantially prevents blockages and limitations in performance of the storm water interceptor 8. The grate 68 of the primary treatment tank maintenance platform 67 is commonly referred to as a "trash rack". The grate 68 is preferred over prior art alternatives, because its location, which requires all storm water to pass through it, reduces flow velocities, thereby causing less disturbance to the trapped oil in the primary treatment tank 10 (i.e., less emulsification). It is also preferable to have a primary treatment tank maintenance platform 67 having a grate 68 when the cover 14 is a catch basin grate due to the substantial flow of water passing through such a catch basin grate.

Connecting the first lower barrel section 22 of the primary treatment tank 10 with the second lower barrel section 30 of the secondary treatment tank 12 is a lower conduit 56, which is made of either PVC or HDPE piping. Such lower conduit 56 may be a straight connection from the primary treatment tank 10 to the secondary treatment tank 12 with no bending. Alternatively, the lower conduit 56 may have bends ranging from 0 to 90 degrees as site specifications may require, such as in cases where there is a need to communicate storm water through the storm water interceptor 8 around a street corner. The lower conduit 56 has a horizontal lower orifice 57 that permits storm water to enter the lower conduit 56 in an upward (vertical) fashion based on an inverted elbow configuration. Once storm water has entered the lower conduit 56, it takes a 90 degree turn at a lower conduit inverted elbow 58, and is then permitted to travel horizontally through the lower conduit 56 to the vertical lower orifice 59, where the storm water may enter the second lower barrel section 30. (Note: references to "vertical" and "horizontal" orifices herein, as the case may be, do not require strict vertical and horizontal implementation for the storm water interceptor 8 to function properly, but rather substantially vertical and horizontal orifices, as the case may be.) The inverted elbow configuration ensures that the horizontal lower orifice 57 is below the invert elevation of the lower conduit 56 (i.e., the invert elevation of the lower conduit 56 is the elevation of the bottom of the horizontal portion of the lower conduit 56), as such a configuration facilitates a bottom draw system that contains oils and other lighter-than-water fluids from the storm water in the first lower barrel section 22. During installation, the lower conduit 56 is pushed into water tight gaskets (not shown) connected to the first and second lower barrel sections 22, 30. By having the first and second lower barrel section walls 23, 31 core drilled to the proper specifications (i.e., diameter), water tight gaskets will fit securely into the lower barrel section walls 23, 31. The 90 degree turn of the lower conduit inverted elbow 58 requiring vertical flow of storm water ensures many suspended petroleum products and oils are trapped in the first lower barrel section 22 of the primary treatment tank 10. Should the water level fall below the horizontal lower orifice 57, then the amount of suspended oil that can escape is reduced.

Further connecting the primary treatment tank 10 and the secondary treatment tank 12 is an overflow conduit 52, which is made of either PVC or HDPE piping. The overflow conduit 52 allows passage of extremely high water volumes, such as in the case of a flood, as well as allows bypassing in case the grate 68 or the lower conduit 56 is plugged. Such overflow conduit 52 may be a straight connection from the primary treatment tank 10 to the secondary treatment tank 12 with no bending. Alternatively, the overflow conduit 52 may have bends ranging from 0 to 90 degrees as site specifications may require, such as in cases where there is a need to communicate storm water through the storm water interceptor 8 around a street corner. Preferably, the overflow conduit 52 has an inverted elbow configuration 55 at its first end connected to the primary treatment tank 10. Accordingly, the overflow conduit 52 has a horizontal overflow orifice 53 and a vertical overflow orifice 54. Due to possible backwater effects during full flow conditions of the input conduit 50, the invert elevation of the overflow conduit 52 (i.e., the invert elevation of the overflow conduit 52 is the elevation of the bottom of the horizontal portion of the overflow conduit 52) should be above (or at least the same as) the obvert elevation of the input conduit 50 (i.e., the obvert elevation of the input conduit 50 is the elevation of the top of the input conduit 50). For installation, the overflow conduit 52 may be comprised of two pieces of PVC pipe connected in the middle by a rubber coupler (not shown) in order to give some flexibility in case of movement due to frost or settlement.

Optionally, as indicated by the dotted lines in FIG. 1, the secondary treatment tank 12 has a secondary treatment tank maintenance platform 71 comprising a second benched section 70, which is made of poured in place concrete and is preferably sloped, and a removable grate 72, which is held in place by the second benched section 70 and supported by a reinforced pre-cast concrete second flat cap section 73. The grate 72 allows storm water to flow from the second upper barrel section 28 into the second lower barrel section 30 while preventing large debris from following the same route during high flow conditions. The optional maintenance platform 71 is preferably installed in the secondary treatment tank 12 when sump depths and safety requirements justify such an installation.

Connected to the secondary treatment tank 12 is an output conduit 60, which permits treated storm water to exit the storm water interceptor 8, and is made of either PVC or HDPE piping. The output conduit 60 has a horizontal output orifice 61 that permits storm water to enter the output conduit 60 in an upward (vertical) fashion based on an inverted elbow configuration. Once storm water has passed through the horizontal output orifice 61, it takes a 90 degree turn at an output conduit inverted elbow 62, and is then travels horizontally further into the output conduit 60. The inverted elbow configuration ensures that the horizontal output orifice 61 is located below the invert elevation of the output conduit 60 (i.e., the invert elevation is of the output conduit 60 is the elevation of the bottom of the horizontal portion of the output conduit 60), as such a configuration acts to trap suspended oil and facilitates proper functioning of the bottom draw system. As well, the invert elevation of the output conduit 60 must be above the obvert elevation of the lower conduit 56 (i.e., the obvert elevation of the lower conduit 56 is the elevation of the top of the horizontal portion of the lower conduit 56) in order for the bottom draw system to function properly. The elevations of the horizontal lower and output orifices 57 and 61 may vary depending on oil and sump capacity required. The degree in which the secondary treatment tank 12 retains emulsified oils further depends upon the elevation of the horizontal output orifice 61. Performance is increased as the elevation of the horizontal output orifice 61 decreases relative to the obvert elevation of the lower conduit 56. To install, the output conduit 60 is pushed into a water tight gasket (not shown) securely connected to the second lower barrel section 30 by having a hole core drilled into the second lower barrel section wall 31 to the specified outside diameter of the water-tight gasket. Once moving horizontally in the output conduit 60, treated storm water travels to an appropriate location for disposal, such as a further treatment site or a body of water such as a lake or river.

With reference to FIG. 2, the exact position of the output conduit 60 relative to the second lower barrel section wall 31 depends upon the location of existing storm water sewer connections. If necessary, the output conduit 60 could be rotated relative to the second lower barrel section wall 31 and the lower conduit 56. However, it is preferable that any such rotation not be substantial. Where substantial rotation is necessary, then the angle between the primary treatment tank 10 and the secondary treatment tank 12 can be adjusted to suit the particular circumstances.

Equilibrium water level 76, as shown in FIG. 1 by a dotted line, and which varies depending upon the volume of storm water passing through the storm water interceptor 8, is determined by the invert elevation of output conduit 60. Both the primary and secondary treatment tanks 10, 12 may be serviced by maintenance personnel who are able to descend inside the tanks 10, 12 using the ladders 24, 32, as well as stand upon the maintenance platforms 67, 71, all while staying above the water level 76. The maintenance platforms 67, 71 act as safety platforms above the equilibrium water level 76. Because the grates 68, 72 are removable, further maintenance may be conducted in the lower sections 22, 30 once the tanks 10, 12 have been pumped out. It is particularly preferable to ensure a primary treatment tank maintenance platform 67 having a grate 68 is installed in cases where the equilibrium water level 76 exceeds 1.2 m in elevation.

The vertical distance between the invert elevation of the output conduit 60 and the horizontal lower orifice 57 determines the capacity in which the primary treatment tank 10 may hold oils and other petroleum-like products. Much like the lower conduit 56, the output conduit 60 is equipped with a 90-degree output conduit inverted elbow 62 that prevents oil from escaping the secondary treatment tank 12. The vertical distance between the invert elevation of the output conduit 60 and the horizontal output orifice 61 determines the capacity in which the secondary treatment tank 12 may hold oils and other petroleum-like products. Preferably, a distance of 400 mm or greater is maintained between the horizontal lower orifice 57 and the rectangular base section 44 in order to prevent blockage from grit and sediment. Efficiency of the storm water interceptor 8 increases as the distance between the equilibrium water level 76 and the horizontal lower orifice 57 increases.

In sum, the primary treatment tank 10 of the present invention separates a substantial amount of coarse trash, large debris, heavy sediments, and petroleum based contaminants. Heavy suspended particles will settle out. A substantial amount of the grease, oil and other lighter-than-water fluids entering the primary treatment tank 10 will rise, become suspended and be trapped by the bottom draw system, as described above. Any emulsified oil or other lighter-than-water fluids that happen to enter the secondary treatment tank 12 will tend to separate and remain in the second lower barrel section 30 above the elevation of the horizontal output orifice 61. The amount of oil and other lighter-than-water fluids trapped by the storm water interceptor 8 depends upon the flow conditions that exist.

Preliminary testing results of an exemplary embodiment of the present invention have yielded excellent results with respect to the separation capabilities between the primary and secondary treatment tanks 10, 12. For example, prior art installations typically separate 40-50% of suspended solids found in untreated storm water. A test conducted in respect of an embodiment of the present invention yielded approximately 90% separation of suspended solids from the untreated storm water. The same test yielded approximately a 50% separation rate of suspended oils and greases from the surface water between treatment tanks 10 and 12, which is also an excellent result when compared with the separation rates of prior art installations. Additionally, preliminary tests have shown that embodiments of the present invention are able to treat approximately 99% of water flows based on a 10-year storm return period. Conversely, prior art installations do not have such a high level of treatment, and overflow (i.e., allow water to bypass treatment stages) much more often.

The storage capacity of both tanks 10, 12 can be increased to handle larger volumes if required. Exact conduit sizes, invert elevations and design capacities are preferably verified by an engineer familiar in hydrology. Those skilled in the art will understand that annual maintenance of the storm water interceptor 8 must include pumping of suspended oil, removal of grit and visual inspection for leaks. Those skilled in the art will also understand that tank sizes and depths will vary based on drainage area, precipitation, return period and frost levels present at particular installation sites. Those skilled in the art will also understand that it is preferable to install the storm water interceptor 8 next to a backfill material that is free-draining, such as sand or gravel, and compacted to 95% dry density, as this will reduce movement of the storm water interceptor 8 due to frost heaves. Also, enough room must be maintained between treatment tanks 10, 12 to allow for compaction equipment. Advantageously, when compared with existing storm water treatment systems known in the art, embodiments of the present invention are more affordable, versatile and adaptable for various site conditions and geographic locations.

As well, the embodiments of the present invention have the advantage of decreasing storm water temperature. This is because the retention time inside the storm water interceptor 8 causes a drop in water temperature due to the depth of the equilibrium water level 76. Cooler ground surrounding the storm water interceptor 8 moderates the temperature of the retained storm water. For example, when a rain storm begins, runoff is often warmed by the typically hot asphalt covering a parking area. The initial heavy runoff flow would then be tempered by the large volume of cooler water retained in the interceptor 8. As the rain storm continues, the pavement cools and the runoff temperature decreases resulting in retention not being as critical. This drop in temperature of the storm water is important when storm water discharges into a cold water creek or stream, as water temperatures that are too warm can destroy fish habitats in cold water tributaries.

Further to the foregoing, an optional embodiment of the present invention involves the use of a tertiary treatment tank 80 (see dotted lines), as shown in FIG. 3. The same principles as with the storm water interceptor 8 having primary and secondary treatment tanks 10, 12 similarly apply to a storm water interceptor 8 having primary, secondary and tertiary treatment tanks 10, 12, 80. In much the same way as with the primary and secondary treatment tanks 10, 12, the tertiary treatment tank 80 has third transition section 82, third transition section wall 83, third upper barrel section 84, third upper barrel section wall 85, third lower barrel section 86, third lower barrel section wall 87, cover 88, optional tertiary treatment tank maintenance platform 91 comprising a third benched section 90, a grate 92 and a third flat cap section 93, and tertiary rectangular base section 94.

In such a tertiary treatment tank 80 embodiment, the various interconnecting conduits would include an input conduit 100, a first lower conduit 102, a second lower conduit 104, a first overflow conduit 106, a second overflow conduit 108 and an output conduit 110. The same flow principles as described above regarding a storm water interceptor 8 having just primary and secondary treatment tanks 10, 12 would apply here.

The main advantage of having a tertiary treatment tank 80 is further improved quality of storm water treatment (i.e., separation of oils and suspended-particulate from storm water). Even greater treatment quality could be achieved by having further embodiments that comprise more than three tanks, though space restrictions may prevent implementation of such embodiments. The same components would apply in such instances of more than three tanks, as well as corresponding new components, all connected in a cascading manner as can be seen from FIG. 3.

While particular embodiments of the present invention have been shown and described, changes and modifications may be made to such embodiments without departing from the true scope of the invention.

What is claimed is:

1. A storm water interceptor comprising:
   an input conduit connected to a first treatment tank for delivering storm water to the first treatment tank and having an obvert elevation;
   a lower conduit having an invert elevation, a substantially horizontal orifice at a first end connected to the first treatment tank and an exit orifice at an opposite end connected to a second treatment tank, whereby the substantially horizontal orifice at the first end of the lower conduit is below the invert elevation of the lower conduit;
   an overflow conduit connecting the first treatment tank to the second treatment tank, whereby the overflow conduit is connected to the first treatment tank at a location above the obvert elevation of the input conduit; and,
   an output conduit having a substantially horizontal orifice at a first end connected to the second treatment tank and an exit portion extending away from the second treatment tank, whereby an invert elevation of the output conduit is above an obvert elevation of the lower conduit, and whereby the substantially horizontal orifice at the first end of the output conduit is below the invert elevation of the output conduit.

2. The storm water interceptor according to claim 1, wherein the first treatment tank contains a first maintenance platform located below the input conduit and above the invert elevation of the output conduit.

3. The storm water interceptor according to claim 2, wherein the first maintenance platform comprises a first grate, a first benched section and a first flat cap section.

4. The storm water interceptor according to claim 3, wherein the first treatment tank has a cover that is a catch basin grate and the second treatment tank has a cover that is a solid manhole lid.

5. The storm water interceptor according to claim 1, wherein the first treatment tank contains a first maintenance platform located below the input conduit and above the invert elevation of the output conduit, and the second treatment tank contains a second maintenance platform located below the overflow conduit and above the obvert elevation of the output conduit.

6. The storm water interceptor according to claim 5, wherein the first maintenance platform comprises a first grate, a first benched section and a first flat cap section, and the second maintenance platform comprises a second grate, a second benched section and a second flat cap section.

7. The storm water interceptor according to claim 1, whereby the first end of the lower conduit, a first end of the overflow conduit and the first end of the output conduit are each an inverted elbow shape, whereby the first end of the overflow conduit is connected to the first treatment tank.

8. The storm water interceptor according to claim 1, wherein the first and second treatment tanks are substantially cylindrical.

9. The storm water interceptor according to claim 1, wherein the first and second treatment tanks each have covers that are solid manhole lids.

10. The storm water interceptor according to claim 1, whereby inside each of the first and second treatment tanks is a ladder.

11. The storm water interceptor according to claim 1, whereby each of the first and second treatment tanks have rectangular base sections.

12. The storm water interceptor according to claim 1, wherein the overflow conduit has a substantially horizontal orifice at a first end that is connected to the first treatment tank, and a substantially vertical orifice at an exit end that is connected to the second treatment tank.

13. The storm water interceptor according to claim 1, wherein the first and second treatment tanks each comprise separately constructed covers, transition sections, upper barrel sections and lower barrel sections.

14. The storm water interceptor according to claim 13, wherein each of the upper barrel and lower barrel sections are cylindrical, and each of the transition, upper barrel and lower barrel sections are made of reinforced pre-cast concrete.

15. The storm water interceptor according to claim 14, wherein the input conduit is located to deliver storm water to the upper barrel section of the first treatment tank, the lower conduit is located to communicate storm water from the lower barrel section of the first treatment tank to the lower barrel section of the second treatment tank, the overflow conduit is located to communicate storm water from the upper barrel section of the first treatment tank to the upper barrel section of the second treatment tank, and the output conduit is located to communicate storm water from the lower barrel section of the second treatment tank to an appropriate location for disposal.

16. The storm water interceptor according to claim 15, wherein the first treatment tank contains a first maintenance platform located below the input conduit and above the invert elevation of the output conduit, wherein the first maintenance platform acts as a demarcation between the upper barrel and lower barrel sections of the first treatment tank.

17. A storm water interceptor comprising:
   a plurality of treatment tanks, wherein the plurality comprises at least primary, secondary and tertiary treatment tanks;

an input conduit connected to the primary treatment tank for delivering storm water to the primary treatment tank and having an obvert elevation;

a plurality of lower conduits each having a substantially horizontal orifice at a first end and each connected to one of the plurality of treatment tanks, and each having an exit orifice at an opposite end each connected to an adjacent one of the plurality of treatment tanks, whereby each of the substantially horizontal orifices at the first ends of the respective lower conduits are below invert elevations of the respective lower conduits;

a plurality of overflow conduits each connecting one of the plurality of treatment tanks to an adjacent one of the plurality of treatment tanks, whereby the overflow conduit connected to the primary treatment tank is located above the obvert elevation of the input conduit; and, an output conduit having an invert elevation, a substantially horizontal orifice at a first end connected to a last treatment tank and an exit portion extending away from the last treatment tank, whereby the invert elevation of the output conduit is above an obvert elevation of an adjacent lower conduit, and whereby the substantially horizontal orifice at the first end of the output conduit is below the invert elevation of the output conduit.

18. The storm water interceptor according to claim 17, wherein the primary treatment tank contains a primary maintenance platform located below the input conduit and above the invert elevation of the output conduit, wherein the primary maintenance platform comprises a primary grate, a primary benched section and a primary flat cap section.

19. The storm water interceptor according to claim 18, comprising at least secondary and tertiary maintenance platforms inside the secondary and tertiary treatment tanks, respectively, whereby the at least secondary and tertiary maintenance platforms are positioned below the plurality of overflow conduits and above an obvert elevation of the output conduit.

20. The storm water interceptor according to claim 17, wherein the plurality of treatment tanks each comprise separately constructed covers, bases, transition sections, upper barrel sections and lower barrel sections, whereby each of the upper barrel and lower barrel sections are cylindrical and made of reinforced pre-cast concrete.

* * * * *